United States Patent
Rowley

(10) Patent No.: US 8,090,686 B2
(45) Date of Patent: Jan. 3, 2012

(54) MULTI-MASTER ATTRIBUTE UNIQUENESS

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 320 days.

(21) Appl. No.: 11/706,011

(22) Filed: Feb. 13, 2007

(65) Prior Publication Data

US 2008/0195616 A1 Aug. 14, 2008

(51) Int. Cl.
G06F 7/00 (2006.01)
G06F 17/00 (2006.01)

(52) U.S. Cl. ........................ 707/613; 707/623

(58) Field of Classification Search ................ 707/201, 707/8, 615

See application file for complete search history.

(56) References Cited

U.S. PATENT DOCUMENTS

| | | | |
|---|---|---|---|
| 5,799,141 A * | 8/1998 | Galipeau et al. ............. | 714/13 |
| 6,192,362 B1 | 2/2001 | Schneck et al. | |
| 6,339,827 B1 | 1/2002 | Stokes et al. | |
| 6,347,312 B1 * | 2/2002 | Byrne et al. ............... | 707/3 |
| 6,418,441 B1 | 7/2002 | Call | |
| 6,470,354 B1 * | 10/2002 | Aldridge et al. ............ | 1/1 |
| 6,651,070 B1 | 11/2003 | Hirashima et al. | |
| 6,715,128 B1 | 3/2004 | Hirashima et al. | |
| 6,947,953 B2 | 9/2005 | Herzenberg et al. | |
| 6,970,873 B2 | 11/2005 | Fu et al. | |
| 7,043,472 B2 | 5/2006 | Aridor et al. | |
| 7,209,970 B1 | 4/2007 | Everson et al. | |
| 7,444,594 B2 | 10/2008 | Abbott et al. | |
| 2003/0037044 A1 | 2/2003 | Boreham et al. | |
| 2003/0055917 A1 | 3/2003 | Boreham et al. | |
| 2003/0061347 A1 | 3/2003 | Boreham et al. | |
| 2003/0078937 A1 | 4/2003 | Boreham et al. | |
| 2003/0078995 A1 | 4/2003 | Boreham et al. | |
| 2003/0084069 A1 | 5/2003 | Boreham et al. | |
| 2003/0088656 A1 | 5/2003 | Wahl et al. | |
| 2003/0088678 A1 | 5/2003 | Boreham et al. | |
| 2003/0105733 A1 | 6/2003 | Boreham et al. | |
| 2003/0105742 A1 | 6/2003 | Boreham et al. | |
| 2003/0115196 A1 | 6/2003 | Boreham et al. | |
| 2003/0135491 A1 | 7/2003 | Rowley | |
| 2003/0191751 A1 | 10/2003 | Vora et al. | |
| 2004/0006557 A1 | 1/2004 | Baker et al. | |
| 2004/0267670 A1 | 12/2004 | Minyailov | |
| 2005/0021498 A1 | 1/2005 | Boreham et al. | |
| 2005/0060646 A1 | 3/2005 | Gauthier et al. | |
| 2005/0080792 A1 | 4/2005 | Ghatare | |
| 2005/0160090 A1 | 7/2005 | Harjanto | |
| 2005/0171958 A9 | 8/2005 | Cheng et al. | |
| 2005/0203897 A1 | 9/2005 | Kapitskaia et al. | |
| 2005/0216485 A1 | 9/2005 | Bell et al. | |
| 2005/0228794 A1 | 10/2005 | Navas et al. | |

(Continued)

OTHER PUBLICATIONS

Randy Urbano, Oracle (r) Database Advanced Replication, Dec. 2003, 10g Release 1 (10.1), Oracle Corporation.*

(Continued)

*Primary Examiner* — Angela Lie
*Assistant Examiner* — Kris Mackes
(74) *Attorney, Agent, or Firm* — Lowenstein Sandler PC

(57) ABSTRACT

A distributed database server receives a recursive lock/search request, acquires a local lock, and propagates the recursive lock/search request to a peer database server. Specific implementations within a Lightweight Directory Access Protocol ("LDAP") server are described, and applications that can benefit from the recursive locking and searching functionality are discussed.

19 Claims, 7 Drawing Sheets

U.S. PATENT DOCUMENTS

| | | | |
|---|---|---|---|
| 2006/0122963 A1* | 6/2006 | Klein et al. | 707/2 |
| 2007/0016575 A1 | 1/2007 | Hurst-Hiller et al. | |
| 2007/0149190 A1 | 6/2007 | Matsuhashi | |
| 2007/0240050 A1 | 10/2007 | Quinn-Jacobs | |
| 2008/0114770 A1 | 5/2008 | Chen et al. | |

OTHER PUBLICATIONS

Wahl, M., Netowrk Working Group, A summary of the X.500(96) User Schema for use with LDAPv3, Critical Angle Inc., Dec. 1997, 15 pages.

Zeilenga, K., Network Working Group, Lightweight Directory Access Protocol (LDAP): Technical Spericiation Road Map, OpenLDAP Foundation, Jun. 2006, 8 pages.

Office Action mailed Nov. 12, 2008 for U.S. Appl. No. 11/607,559.
Office Action mailed Apr. 30, 2009, for U.S. Appl. No. 11/607,559.
Office Action mailed Oct. 5, 2009, for U.S. Appl. No. 11/607,559.
Office Action mailed Mar. 16, 2010, for U.S. Appl. No. 11/607,559.
Office Action mailed Jun. 18, 2010, for U.S. Appl. No. 11/607,559.
Office Action mailed Dec. 9, 2008, for U.S. Appl. No. 11/656,579.
Office Action mailed Apr. 27, 2009, for U.S. Appl. No. 11/656,579.
Office Action mailed Sep. 24, 2009, for U.S. Appl. No. 11/656,579.
Office Action mailed Apr. 28, 2010, for U.S. Appl. No. 11/656,579.
Office Action mailed Dec. 18, 2008, for U.S. Appl. No. 11/703,310.
Office Action mailed Oct. 28, 2009, for U.S. Appl. No. 11/703,310.
Office Action mailed Mar. 2, 2010, for U.S. Appl. No. 11/703,310.
Office Action mailed Aug. 18, 2010, for U.S. Appl. No. 11/703,310.
Office Action mailed Nov. 19, 2010, for U.S. Appl. No. 11/607,559.
Red Hat Notice of Allowance for U.S. Appl. No. 11/607,559 (5220P023) mailed Jun. 17, 2011.

* cited by examiner

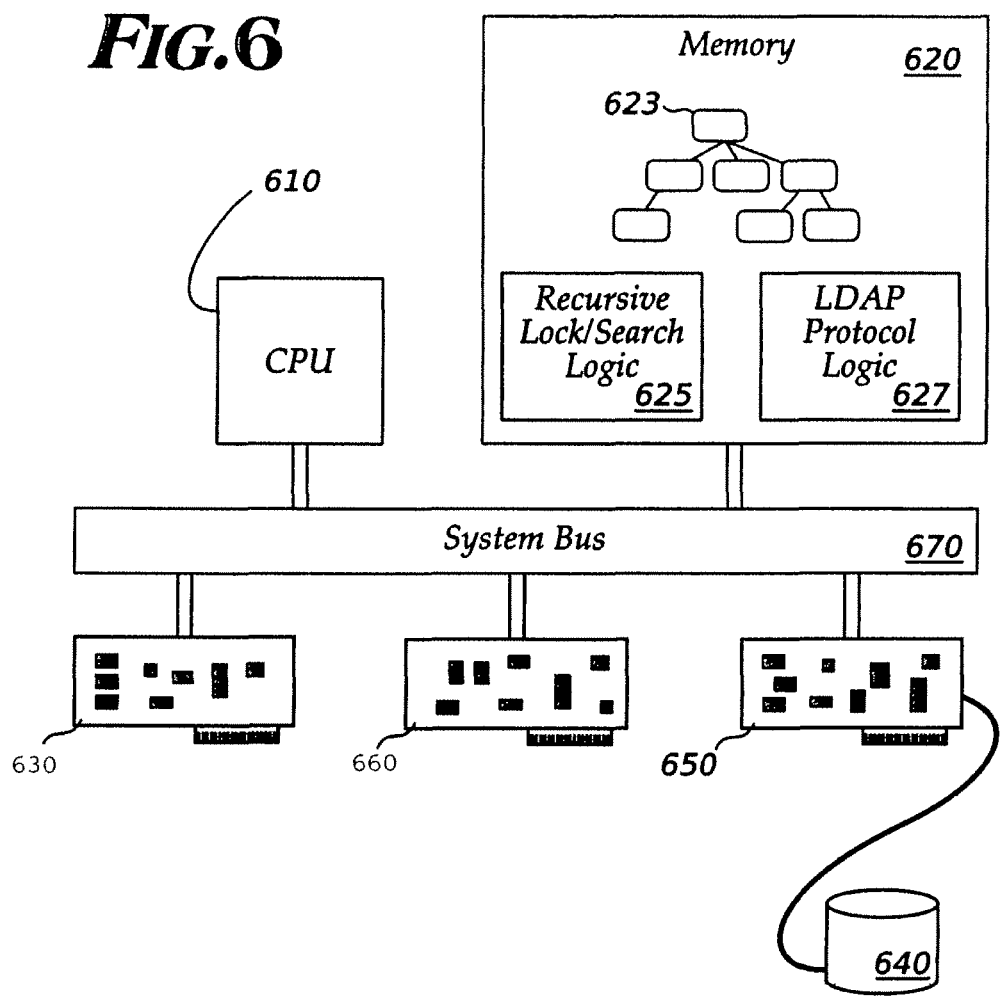

MULTI-MASTER ATTRIBUTE UNIQUENESS

FIELD

The invention relates to hierarchical database operations. In particular, the invention provides mechanisms to extend the capabilities of a Lightweight Directory Access Protocol ("LDAP") database.

BACKGROUND

The Lightweight Directory Access Protocol ("LDAP") is a standard computer networking protocol for querying and modifying entries in a database. The basic protocol is defined in a group of Internet Engineering Task Force ("IETF") Request for Comments ("RFC") documents; various aspects of the current version of the protocol (version 3) are described in RFCs listed in the "LDAP Technical Specification Road Map" (RFC4510, published June 2006). The databases reachable through LDAP may contain any sort of data, but most commonly contain identity, contact and authorization information for people and organizations.

LDAP presents a hierarchical view of the data in a database. Records are presented as a tree of entries, each entry identified uniquely within the hierarchy by its Distinguished Name ("DN"). Entries contain one or more attributes, which consist of an attribute description (an attribute type with zero or more options), plus one or more values of the attribute. For example, an attribute type might be "givenName", and its value might be a text string that is the given name of a person described by the record.

Access to data in an IDAP database is provided by an IDAP server, which responds to commands from an LDAP client. For example, a client may create a new entry, delete an entry, rename an entry, modify an entry, or (most commonly) retrieve the attributes in an entry.

The IDAP standards specify certain properties that compliant servers (and their underlying databases) must have. These properties are known by the acronym ACID: Atomicity (updates must happen in an all-or-none fashion); Consistency (updates must begin at a consistent state and leave the updated database in a new consistent state); Isolation (no part of a multi-part update is visible to other clients until the complete update is performed); and Durability (successful updates will not be lost).

These properties are relatively easy to achieve in a single-server IDAP implementation, but a large network with many clients may generate enough IDAP operations to overwhelm a single server. Additional IDAP service capacity can be added with slave servers that respond to read-only (query) requests, while a master server handles all updates. However, some environments perform enough updates to overwhelm a single master server, and other environments (e.& geographically distributed networks) may operate more efficiently with a nearby master server. Unfortunately, it can be difficult for an LDAP service with multiple master servers to guarantee atomicity, consistency, isolation and durability of updates while maintaining the protocol's favorable speed characteristics. Operational techniques to coordinate multiple master servers may be of value.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

FIG. 6 shows some components and subsystems of a computing device that implements an embodiment of the invention.

DETAILED DESCRIPTION

Embodiments of the invention implement a recursive lock-and-propagate protocol to coordinate independent master database servers. Each master server maintains a local copy of the database, and coordinates its operations with other masters to ensure that data changes made by one master are distributed or propagated to the other masters. A specific application of the protocol, to permit unique attributes to be reliably created in a multi-master database network, is also described.

Figure 1:
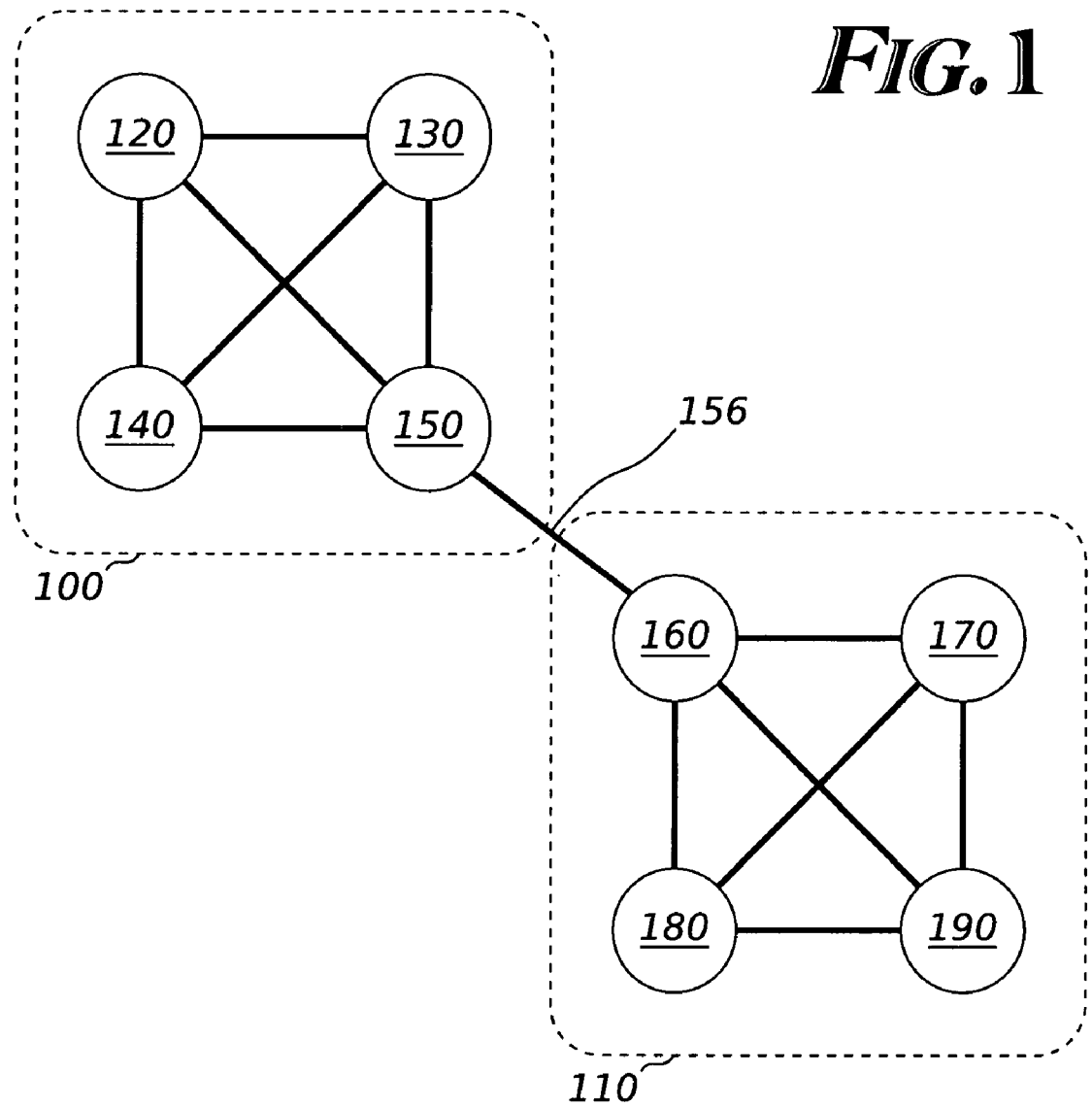
FIG. 1 shows a network of IDAP master servers.

FIG. 1 shows two groups 100, 110 of four database servers 120, 130, 140, 150; and 160, 170, 180, 190. Each group is fully connected (that is, all of the servers in each group have connections to every other server in the group), and the two groups are connected via a link 156 between server 150 in group 100 and server 160 in group 110. The servers shown are "master" servers: any of them can accept and perform updates to a common database that is shared by all the servers. Changes accepted at one master should be propagated to the other masters through some protocol, but it is not required by an embodiment of the invention that the master-interaction protocol guarantee immediate consistency or timely propagation. Read-only (or "slave") servers, not shown, may be associated with any of the master servers to provide additional capability for servicing client requests that do not involve data modification.

Figure 2:
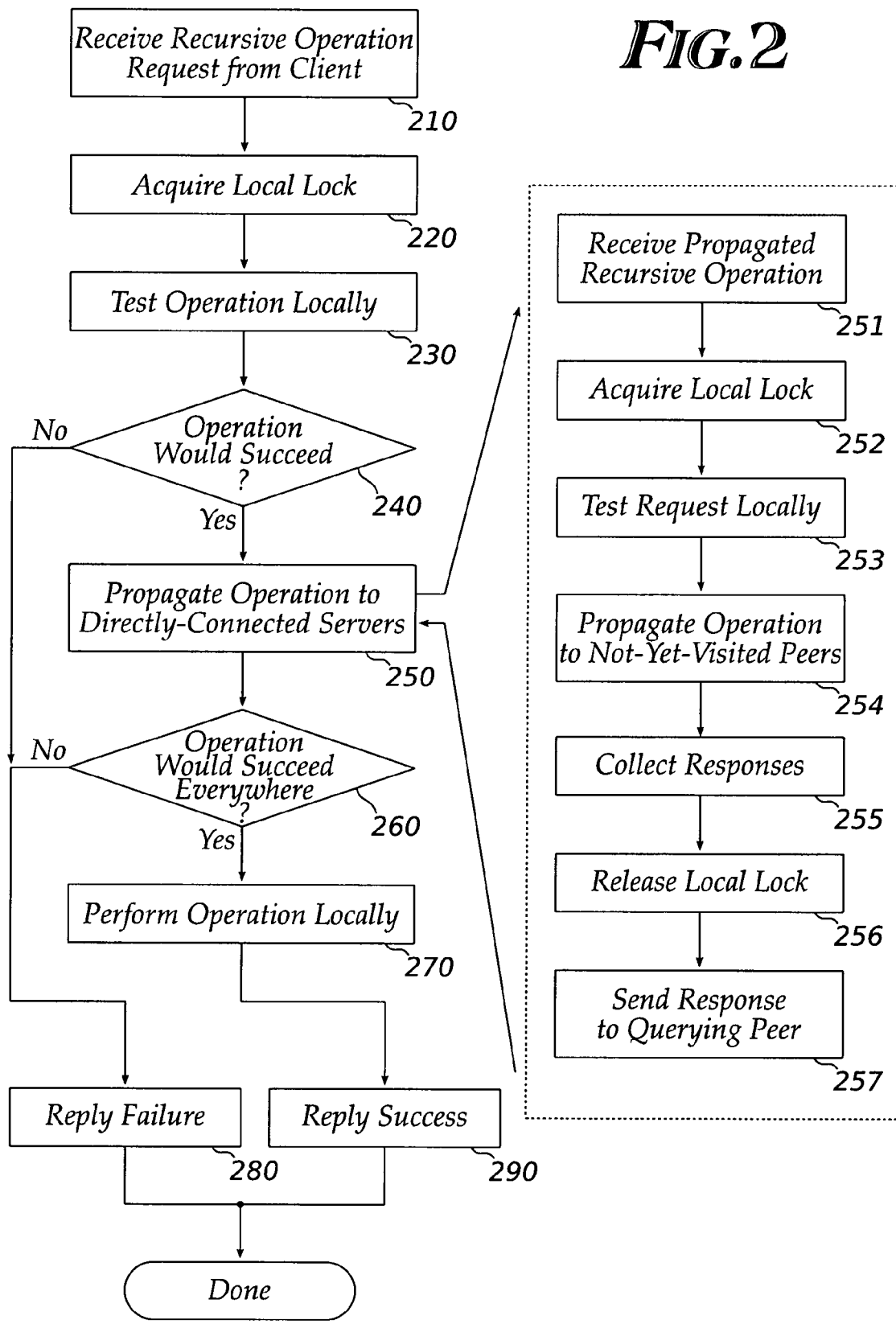
FIG. 2 outlines a method for ensuring attribute consistency in a database distributed across multiple masters.

The master servers shown in FIG. 1 implement the recursive lock-and-propagate algorithm outlined in FIG. 2. A first server receives an initiating request from a client (210). The request includes a flag or other indicator to trigger the algorithm. The first server acquires a local lock (220). This is a lock that will be respected within the server itself (e.g. if the server is multi-threaded, no other thread will be able to acquire the local lock until the present invocation of the algorithm completes). However, other master servers need not have access to the lock, and need not respect it. The lock can be implemented, for example, as a mutex, semaphore or similar synchronization primitive using facilities provided by the operating system.

Next, the first server tests the requested operation on its local copy of the database (230). For example, if the client has requested a search for a record containing a certain attribute/value combination, the server confirms that such a record exists. If the client has requested to delete a particular record, the server checks to see that the record exists and can be deleted. If the test fails (240), an "unsuccessful" response is returned (280).

If the operation would succeed locally, the first server propagates the request to each master server that is directly connected to the first server (250). The propagated request (including the flag or other indicator to activate recursive lock-and-propagate operations) includes a list of servers that will be, or already have been, queried (the precise makeup of the list is discussed in further detail below).

When a server receives a propagated request (251), it acquires a local lock of its own (252), tests the request locally (253) and propagates the request (including the flag or other indicator, and the list of already-visited servers) to any of its directly-connected peers that have not yet been visited (254). Responses from the directly-connected peers are collected (255), then the local lock is released (256) and a response is sent to the querying peer (257).

If a queried machine is successful in acquiring the local lock and would be able to perform the requested operation, it will report success. Otherwise, it will report failure. If any query of a directly-connected server fails, any remaining directly-connected servers need not be queried; the server can report the failure to the peer server (or ultimately, the client) that sent the request. A response will also include the list of servers visited during the preparation of the response, and the querying server will add those servers to its "already visited" list so that they will not be visited again.

If a client issued a search request to server 120 in FIG. 1, then the request might be propagated to servers 130, 140 and 150 from server 120. Servers 130 and 140 might respond quickly, since neither has any directly-connected servers that are not also directly connected to server 120. Server 150 might hold its local lock longer, while its recursive query to server 160, and server 160's queries of servers 170, 180 and 190, are performed. Eventually, the success or failure of all the lock acquisitions and searches will be reported back to server 120, and from there to the client. Note that although some servers may hold their local locks for only a short period of time (relative to the complete recursive search processing), another recursive search initiated by a client against a different master server will fail if the first master server has not completed the first recursive search because the local lock at the first master server is not available for the second client's search (it is already/still held pending the completion of the first client's search).

The recursive locking and operation test requests include a list of already-visited servers, and may include a list of servers that are scheduled to be visited. The list is to prevent a server from being visited again and again, since each server need only be visited once during each network-wide recursive search. The policy for listing servers can affect the propagation of the recursive operation test through the network. For example, if only actually-visited servers are listed, the overall search may be narrower and deeper. If to-be-visited servers are also listed, the overall search may be broader and shallower. An embodiment may select one policy or another to suit the topology and data communication capabilities of the network.

The recursive locking and operation propagation algorithm described above permits a client to ensure that all the master servers concur on the value of an item in the database (i.e. that any change made at one master server has been correctly propagated to other master servers in the network), and furthermore permits the atomicity, consistency and isolation guarantees of a single server to be extended across a network of servers, as explained in connection with the application described below. Note that there may be a transitional period after a change is made at one master server before the same data has been replicated at all the other servers. In fact, a client may be surprised to be unable to read its own writes, if its read is serviced by a server to which the modified data has not yet propagated. However, the recursive locking and operation propagation algorithm ensures that operations predicated on outdated data that may be attempted at a remote (not-yet-updated) master server will fail during the recursive operation testing process when they are tested at the server where the earlier update was made. A benefit of the algorithm described is simplicity relative to other methods of maintaining a consistent distributed database (e.g. a two-phase commit system where all servers are placed in a ready-to-commit state, then changes are committed everywhere at once).

An embodiment of the invention can be implemented in a network of Lightweight Directory Access Protocol ("LDAP") servers that cooperate to maintain a consistent distributed database. Although the LDAP standards do not define a recursive locking and operation propagation mechanism as described above, such a mechanism can be added to an LDAP server and activated by including a flag called a "control" with a client's LDAP operation request. (The same control may be used for server-to-server queries; it is not necessary to implement a different or non-standard mechanism for the recursive searches that one server sends to its directly-connected peers.) The control directs the server to process the search in a particular way; in this case, the control calls for the server to acquire a local lock, then propagate the operation to its directly-connected peers.

Figure 3:
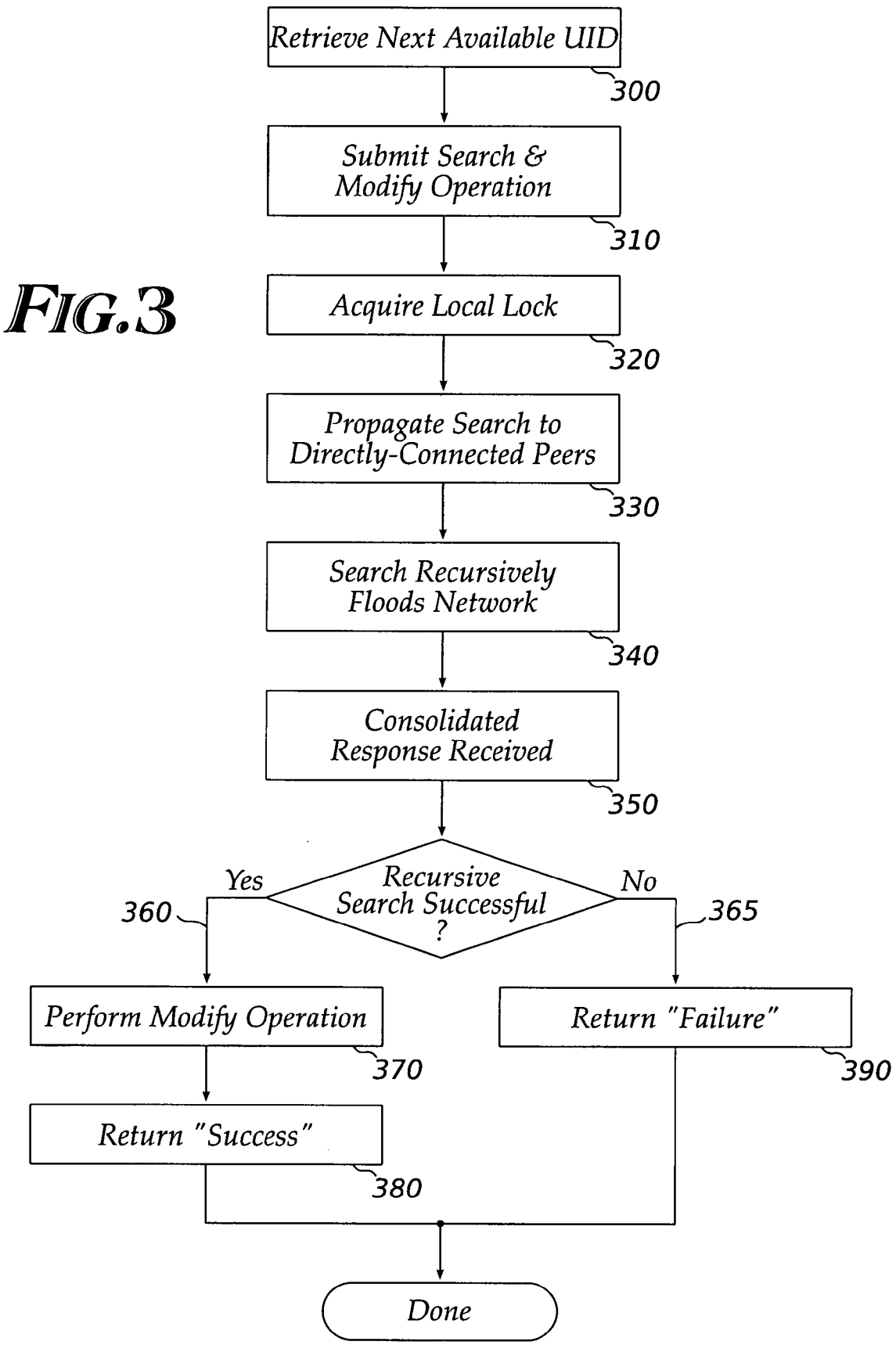
FIG. 3 shows how an embodiment of the invention can be used to create a new unique attribute.

The data maintained by the network of IDAP servers may include attributes that must be unique and consistent. For example, some IDAP entries may refer to computer users, and each computer user may require a unique user identification number ("UID"). When a new user entry is added, a new UID is selected. The UID must be different from others previously used, but the system must also prevent two new users, whose entries are added at different master servers in the network, from selecting the same new, previously unused UID. FIG. 3 explains how this can be accomplished if the distributed database contains an attribute with the next (e.g. sequential) UID ("NextUID") to be allocated.

An IDAP client (i.e. a user management program that is to create the new user entry) retrieves the next UID from an attribute of an entry maintained by an IDAP server (300). This query can be serviced by any master server or slave server in the network. Next, a two-operation "search and modify" request is transmitted to a master server (310). The "search" operation matches the NextUID attribute and the previously-determined value, and the "modify" operation changes NextUID's value to a new, unused UID (for example, to the next successive integer). Because of LDAP's ACID guarantees, both of these operations will succeed, or neither will. Thus, as to the master server that receives the request, the old value of NextUID may be allocated to the user being created, and a new value of NextUID is made available for another new user. However, to ensure that the newly-allocated UID was not previously assigned to another user through operations occurring at a different master server, the "search" operation includes the control that triggers the recursive lock and search algorithm of an embodiment of the invention.

When the master server receives the search-and-modify request with the triggering control, it acquires a local lock (320) and propagates the search to its directly-connected peers (330). The search travels from master to directly-connected master, as described above (340), and eventually a consolidated response is received (350). If the recursive search was successful (360), the modification operation is performed (370) and an IDAP "success" response is returned to the client (380). If the recursive search was unsuccessful (365), a "failure" response is returned to the client (390).

The method outlined in FIG. 3, incorporating recursive locking and searching according to an embodiment of the invention, can ensure that a unique UID is selected for a user, even though there may be an arbitrary delay in propagating UIDs selected for users added through operations at a different master server.

FIGS. 4A-4D show how database contents may develop over time in a small (two master server) distributed LDAP database. At FIG. 4A, both master servers 400, 410 have identical databases, including consistent values 420 for NextUID. At FIG. 4B, client 430 has created a new user record 440 through operations at master server 400. Therefore, master server 400's database contains an updated value 450 for NextUID. However, the updated value has not yet been propagated to master server 410, which still has the old value 420 for NextUID.

Figure 4A:
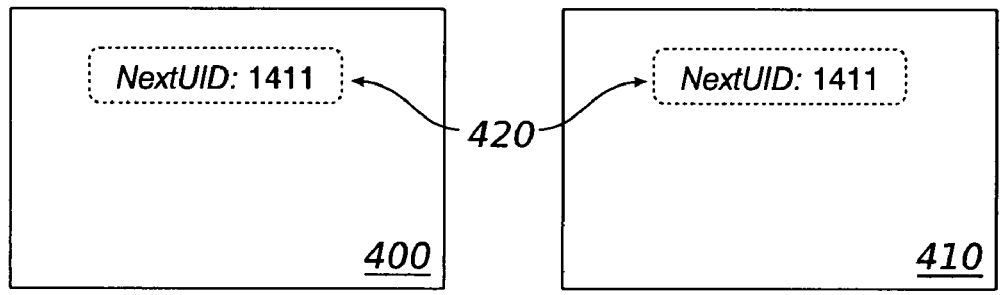
FIGS. 4A-4D show how the local databases of two connected master servers develop in response to client operations.
Figure 4B:
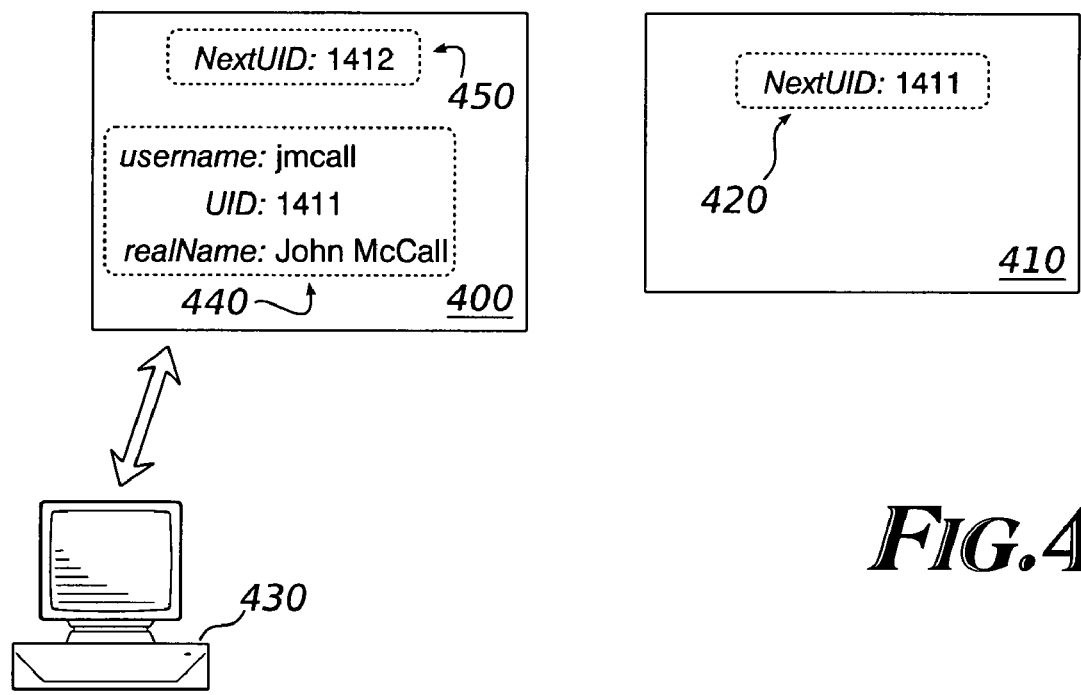
Figure 4C:
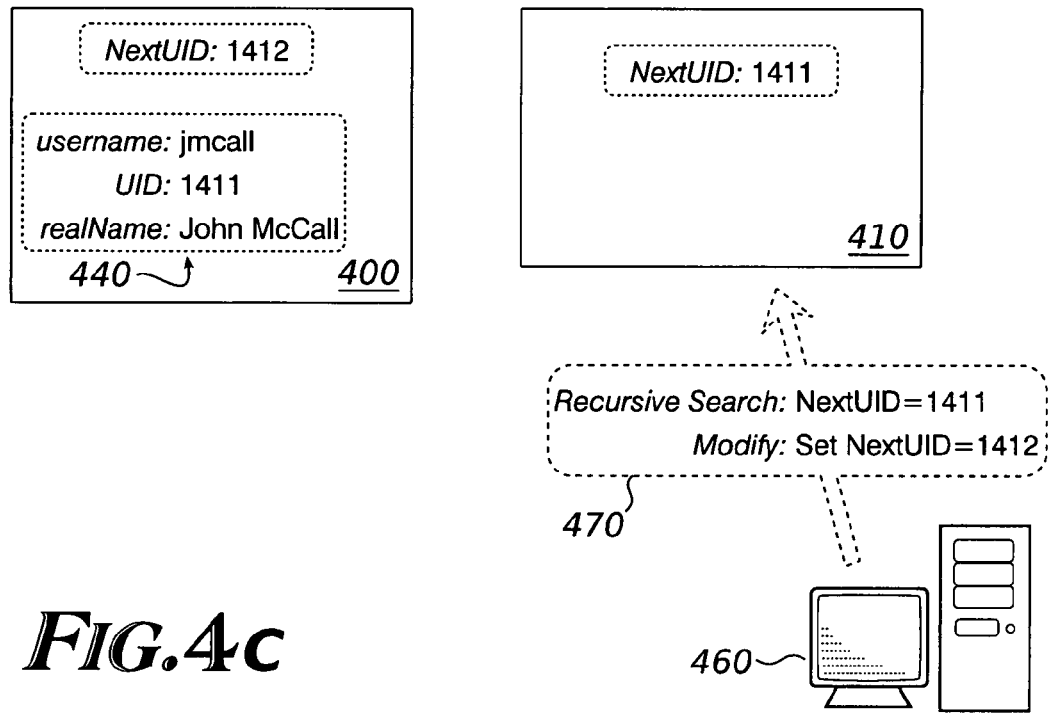
Figure 4D:
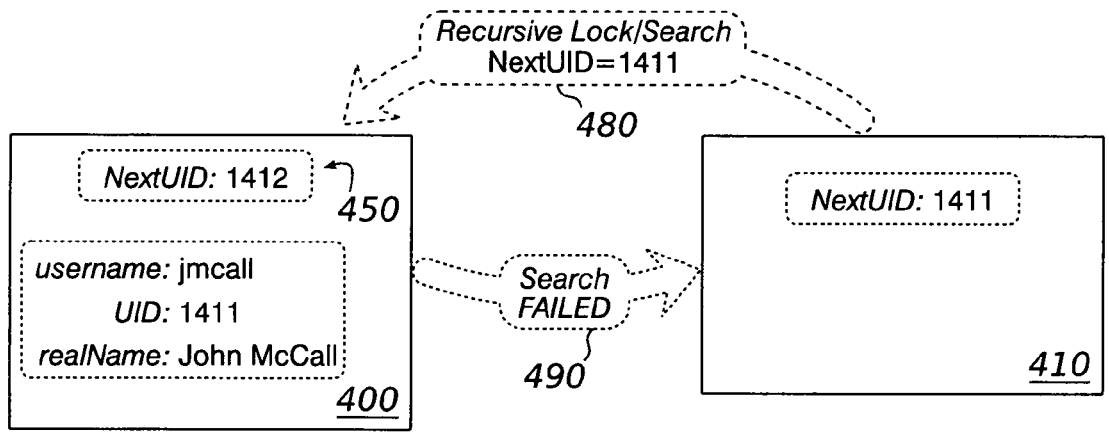

At FIG. 4C, client 460 attempts to allocate a new UID for a new user through operations 470 at master server 410. Client 460 is unaware that the value of NextUID it obtained from master server 410 is actually unavailable because it was already assigned to user record 440. However, at FIG. 4D, the recursive lock and search 480 from server 410 to server 400 fails because the value of NextUID at server 400 has been updated there (element 450). The failure 490 is propagated back to client 460, which may wait a while for the most up-to-date value of NextUID to be distributed throughout the network before retrying its operation.

A variable backoff-and-retry algorithm may reduce the number of contention-failures when two or more clients attempt to add a series of database entries including unique elements. Also, a client with several entries to add may be able to allocate a corresponding number of unique elements all at once, then assign them to the new entries one-at-a-time, without further affecting other clients that are also adding entries.

It is appreciated that a failure during the recursive lock and search procedure may indicate that some data has not propagated throughout the distributed database, and may be used as a trigger to launch an update process. This can support a "lazy" replication paradigm: new and modified data may normally be sent to other master servers on a fixed schedule or when network and processing resources are available, but if a recursive lock and search fails, data corresponding to the failing search may be sent to peer servers immediately. This can help ensure that important or frequently-referenced data is kept more closely synchronized than other, less-frequently referenced information.

The "local lock" used in the recursive lock and search procedure may be a server-wide lock (i.e. only one recursive lock and search may be operative at any time), or it may be connected with an entry or attribute located through the search. The latter arrangement may permit many concurrent lock/search operations, as long as they concern different entries or attributes. Because of the way the search proceeds (each server in the network is only visited once), deadlock is impossible during a single search. However, deadlock scenarios are possible when two servers try to execute recursive queries at the same time. To avoid these deadlocks, local locks should be constructed so that they do not block: a lock request should either succeed immediately or fail immediately (if the lock is already taken). A lock failure propagates back to the original master, which may release its own local lock and delay briefly before trying again.

If a server is unable to propagate a recursive search to one of its directly-connected peers (e.g. the server is offline or down), it should fail in the normal way. The originating server must refuse any modify operation connected with a failed recursive search.

Although the preceding examples have discussed the specific scenario of selecting a unique integer for a UID, those of ordinary skill will recognize that the techniques can be used to create or choose any type of value that must be unique within the distributed database. Group Ids ("GIDs"), usernames, and other unique attributes can be created without risk of duplication.

Figure 5:
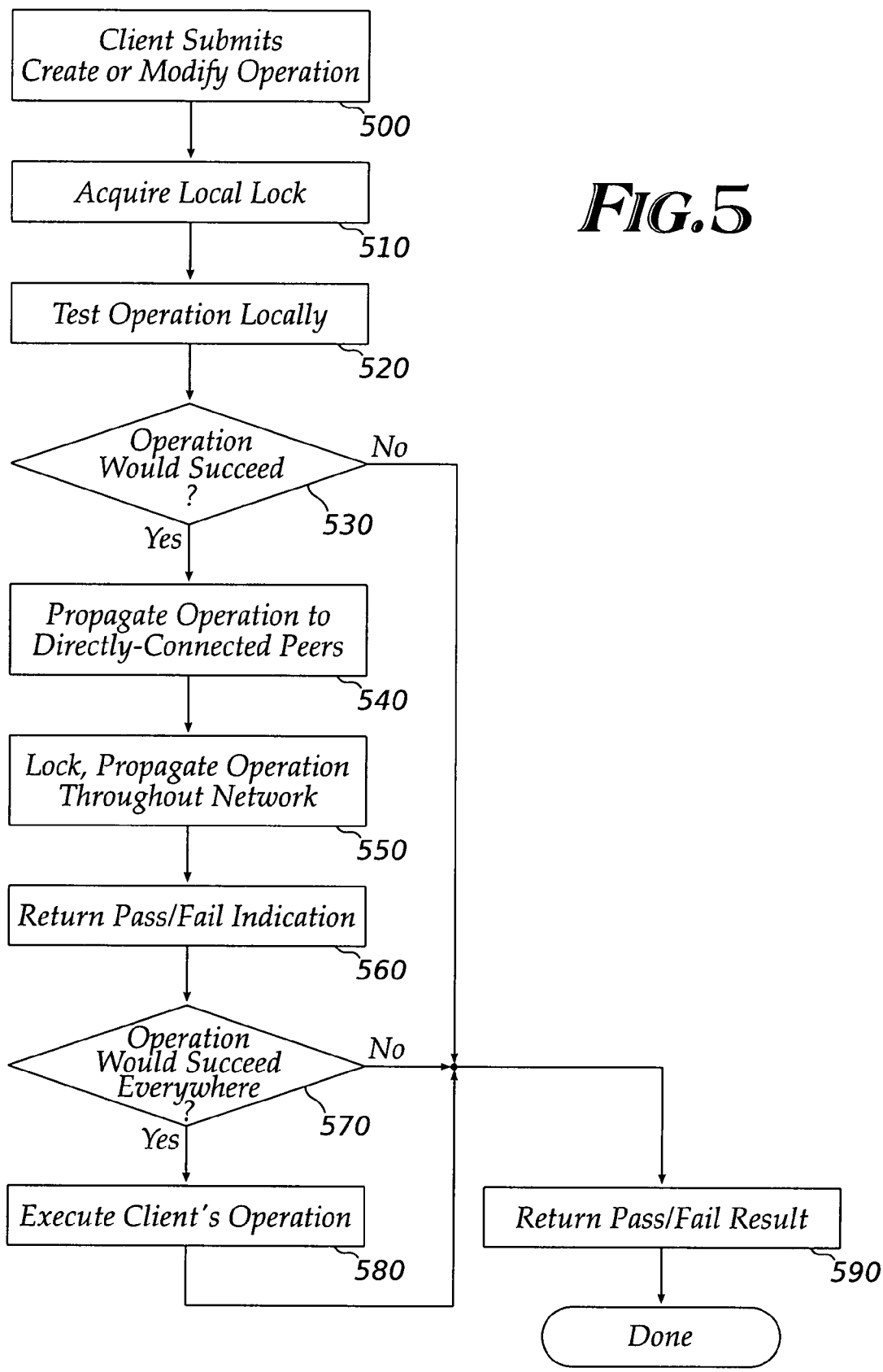
FIG. 5 shows how an embodiment of the invention can operate within the cooperating servers of a distributed database, without special action on the part of a client application.

Some embodiments of the invention can operate exclusively within the server (and in cooperating master servers that also implement an embodiment of the invention), without requiring any special behavior on the part of the client to ensure attribute uniqueness. FIG. 5 outlines this arrangement.

First, a client submits an operation (e.g. an IDAP operation) to a master server to modify an attribute or create a new attribute (500). The attribute is marked in the database as "unique," and the server is configured to perform the following operations when the attribute is created or modified. ("Uniqueness" is a common and useful property for the server to check and enforce, but other properties, such as equivalence to another attribute or a predetermined relationship among a group of attributes, could be substituted.)

The server acquires a local lock (510), tests the operation locally (520), and if the test succeeds (530), propagates the operation to its directly-connected peers (540). The peers, operating as described above, recursively lock and propagate the operation throughout the network (550), finally returning a pass/fail indication (560) to the first server. If the operation would succeed everywhere (570), the first server performs the operation (580) and (either way) returns a success/fail indicator to the client (590). If the client's request fails, it may retry the request after a brief delay on the assumption that the failure was a result of transient connectivity problems, conflicting operations submitted elsewhere, or updated information elsewhere in the network that had not yet become available to the client.

Testing the operation at a server may include verifying that the operation, if completed, would not create a record containing a duplicate of data that was supposed to be unique, or that the operation would maintain another implementation-invariant condition (i.e. one attribute that is always to be equal to another, or always to have a predetermined relationship to another value or group of values).

FIG. 6 shows some components and subsystems of a computer that supports an embodiment of the invention. A programmable processor or "central processing unit" ("CPU") 610 operates under the control of instructions and data stored in memory 620 to perform operations as described above. Memory 620 may contain, for example, entries 623 for a master server's copy of the distributed database, logic 625 to implement the recursive locking and searching, and protocol logic 627 to interact with LDAP clients and cooperating LDAP servers. A network interface card 630 supports communication over a distributed data network (not shown) such as the Internet. A mass storage interface 650 allows the system to store and retrieve data on a mass storage device 640. Data and instructions that are not immediately needed in operations may be stored on mass storage device 640 when they are not in memory 620. Some systems may include a hardware accelerator 660 that contains preconfigured circuitry to implement certain portions of an algorithm. For example, accelerator 660 may implement data replication logic to propagate data in the database to other cooperating master servers if the data is associated with a failed recursive lock and search operation. (Hardware and software are generally logically equivalent, but one or the other may be chosen to achieve benefits such as greater performance or reduced cost.) The components of the system (and others that are not shown in FIG. 5) exchange data and control signals over a system bus 670.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.) etc.

The applications of the present invention have been described largely by reference to specific examples and in terms of particular allocations of functionality to certain hardware and/or software components. However, those of skill in the art will recognize that linked IDAP attributes can also be implemented by software and hardware that distribute the functions of embodiments of this invention differently than herein described. Such variations and implementations are understood to be captured according to the following claims.

I claim:

1. A method comprising:

receiving, by a master server, a request to perform a Lightweight Directory Access Protocol ("LDAP") database operation, wherein the LDAP database operation comprises allocating a unique value to an attribute of an entry in a distributed LDAP database;

acquiring, by the master server, a local lock;

propagating the request to perform the LDAP database operation to a peer server to test uniqueness of the attribute value to be allocated to the entry by determining whether a particular value of the attribute has already been allocated by the peer server;

in response to an indication in a test response from the peer server that the particular value of the attribute has not been allocated by the peer server such that the requested LDAP database operation can be successfully performed at the peer server, allocating the unique attribute value to the entry in the LDAP database by executing the requested LDAP database operation locally in the master server and, subsequently, propagating the allocated attribute value to the peer server; and in response to an indication in the test response from the peer server that the particular value of the attribute has already been allocated by the peer server such that the requested LDAP database operation cannot be successfully performed at the peer server, synchronizing, between the master server and the peer server, a most up-to-date unique attribute value that can be allocated by the master server to the entry in the LDAP database by launching an update process throughout the distributed LDAP database.

2. The method of claim 1 wherein the LDAP database operation is to create the attribute value or modify the attribute value for the entry.

3. The method of claim 1 wherein the attribute value is to be checked for uniqueness in the distributed LDAP database.

4. The method of claim 1 wherein the attribute value is to be checked for equivalence to another value in the distributed LDAP database.

5. The method of claim 1 wherein the attribute value is a user identifier ("UID").

6. The method of claim 1 wherein propagating the request to a peer server comprises:
- transmitting a recursive lock-and-propagate operation request to the peer server, the request to include a list of already-visited peers; and
- receiving a pass/fail indication from the peer server to indicate a result of testing the database operation.

7. The method of claim 6 wherein the peer server is a LDAP server, and wherein the recursive lock-and-propagate operation request comprises an LDAP request including a control to cause recursive lock-and-propagate operation.

8. A computer-readable storage medium containing data and instructions to cause a programmable processor to perform operations comprising:
- maintaining a local version of a distributed Lightweight Directory Access Protocol ("LDAP") database in cooperation with at least one peer server;
- acquiring a local lock in connection with a request to perform an LDAP database operation, wherein the LDAP data operation comprises allocating a unique value to an attribute of an entry in the distributed LDAP database;
- propagating the request to perform the LDAP database operation to the at least one peer server to test uniqueness of the attribute value to be allocated to the entry in the LDAP database by determining whether a particular value of the attribute has already been allocated by the at least one peer server;
- in response to an indication in a test response from the at least one peer server that the particular value of the attribute has not been allocated by the at least one peer server such that the requested LDAP database operation can be successfully performed at the at least one peer server, allocating the unique attribute value to the entry in the LDAP database by executing the requested database operation and, subsequently, propagating the allocated attribute value to the at least one peer server; and
- in response to an indication in a test response from the at least one peer server that the particular value of the attribute has already been allocated by the at least one peer server such that the requested LDAP database operation cannot be successfully performed at the at least one peer server, synchronizing, between the master server and the at least one peer server, a most up-to-date unique attribute value that can be allocated by the master server to the entry in the LDAP database by launching an update process throughout the distributed LDAP database.

9. The computer-readable storage medium of claim 8, wherein the attribute value is one of the following: a user identifier ("UID"), a group identifier ("GID") or a username.

10. The computer-readable storage medium of claim 8, containing additional data and instructions to cause the programmable processor to perform operations comprising:
- receiving a LDAP request, the LDAP request to cause the LDAP database operation; and
- transmitting an LDAP response containing a result of the LDAP database operation.

11. The computer-readable storage medium of claim 8, containing additional data and instructions to cause the programmable processor to perform operations comprising:
- propagating the most up-to-date unique attribute value from the at least one peer server to the master server in response to an indication that the attribute value has already been allocated by the at least one peer server.

12. The computer-readable storage medium of claim 8 wherein propagating the request comprises verifying that the LDAP database operation would not create a duplicate attribute value.

13. The computer-readable storage medium of claim 8 wherein propagating the request comprises verifying that the LDAP database operation maintains a predetermined data relationship.

14. The computer-readable storage medium of claim 8 wherein the local lock is a single lock for the local copy of the distributed LDAP database.

15. The computer-readable storage medium of claim 8 wherein the local lock is associated with a data value to be affected by the database LDAP operation.

16. A system comprising:
- memory to store a local copy of a distributed Lightweight Directory Access Protocol ("LDAP") database;
- protocol logic coupled with the memory to receive and respond to a database request to perform an LDAP database operation for lock-and-propagate logic coupled with the protocol logic to propagate the database request to perform the LDAP database operation to a peer server while holding a local lock, wherein the LDAP database operation comprises allocating a unique value to an attribute of an entry in the distributed LDAP database;
- attribute invariant check logic to test uniqueness of the attribute value to be allocated to the entry based on whether a particular propagated value of the attribute from the peer server has already been allocated locally, and, based on results of the test, to determine whether a propagated database request from the peer server can be successfully performed locally; and
- a processing device coupled to the memory to execute, in response to an indication in a test response from the peer server that the particular value of the attribute has not been allocated by the peer server such that the database request can be successfully performed at the peer server, allocation of the attribute value locally by executing the requested LDAP database operation and to subsequently propagate the allocated attribute value to the peer server, and in response to an indication in the test response from the peer server that the particular value of the attribute has already been allocated by the peer server such that the database request cannot be successfully performed at the peer server, synchronization, between the master server and the peer server, of a most up-to-date unique attribute value that can be allocated locally to the entry in the LDAP database by launching an update process throughout the distributed LDAP database.

17. The system of claim 16 wherein the attribute invariant check logic is to verify that the database request would not duplicate the unique attribute value.

18. The system of claim 16 wherein the local lock is one of a mutex or a semaphore.

19. The system of claim 18 wherein the local lock is associated with an attribute in the local copy of the distributed LDAP database.

* * * * *